United States Patent
Suda

(10) Patent No.: US 8,401,417 B2
(45) Date of Patent: Mar. 19, 2013

(54) POWER SUPPLY DEVICE, HEATING UNIT USING SAME, AND IMAGE FORMING APPARATUS USING SAID HEATING UNIT

(75) Inventor: Takeyuki Suda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 12/938,184

(22) Filed: Nov. 2, 2010

(65) Prior Publication Data

US 2011/0116823 A1    May 19, 2011

(30) Foreign Application Priority Data

Nov. 17, 2009    (JP) .................................. 2009-262368

(51) Int. Cl.
*G03G 15/00*    (2006.01)
(52) U.S. Cl. .......................................................... 399/88
(58) Field of Classification Search .................... 399/88, 399/320
See application file for complete search history.

(56) References Cited

U.S. PATENT DOCUMENTS

| | | | | |
|---|---|---|---|---|
| 6,373,232 | B1 * | 4/2002 | Mano et al. | 323/282 |
| 6,608,289 | B2 | 8/2003 | Tsuruya | 219/619 |
| 7,860,414 | B2 * | 12/2010 | Itoh et al. | 399/33 |
| 2009/0067867 | A1 * | 3/2009 | Yamashita et al. | 399/67 |

FOREIGN PATENT DOCUMENTS

JP    2002-231427    8/2002

* cited by examiner

*Primary Examiner* — Walter Lindsay, Jr.
*Assistant Examiner* — Frederick Wenderoth
(74) *Attorney, Agent, or Firm* — Fitzpatrick, Cella, Harper & Scinto

(57) ABSTRACT

The invention reduces loss produced when a power supply device supplies power to a fixing unit of a copier, thereby contributing to a reduction in size, a saving in terms of energy and lower cost. To achieve this, it is arranged so that it is possible to vary the capacitance of a resonant capacitor C200 that constructs a resonant circuit together with a coil 71 through which a high-frequency current flows in order to produce an induced electromotive force in an electrically conductive heating element. In an interval in which a tail current flows after closure of an IGBT 401 that switches the coil current, the capacitance of the resonant capacitor C200 of a switching element SW402 is increased, thereby suppressing a rise in voltage Vce of the IGBT 40 over a fixed interval of time. As a result, loss ascribable to the tail current is reduced.

11 Claims, 11 Drawing Sheets

POWER SUPPLY DEVICE, HEATING UNIT USING SAME, AND IMAGE FORMING APPARATUS USING SAID HEATING UNIT

BACKGROUND OF THE INVENTION

1. Field of the Invention

The present invention relates to a power supply device used in an image forming apparatus. More particular, the invention relates to a power supply device used in an inductive-heating-type heating unit, the heating unit that uses this power supply device, and an image forming apparatus that uses the heating unit.

2. Description of the Related Art

An electrophotographic image forming apparatus is equipped with a fixing device for fixing a toner image that has been transferred to a print medium such as paper. Although devices using a ceramic heater or halogen heater are in wide use, such fixing devices that rely upon electromagnetic inductive superheating have come into use in recent years. A voltage-resonance-type power supply shown in FIG. 10 (see the specification of U.S. Pat. No. 6,608,289, for example) is an example of a power supply device for supplying power to a fixing device that uses inductive heating.

A power supply device 524 shown in FIG. 10 includes a bridge diode D101, a smoothing capacitor C210, a resonant capacitor C201, a switching element SW401, a driving circuit 410 for driving the switching element SW401, and a control circuit 411 for controlling the driving circuit 410. The power supply device 524 is adapted so as to receive commercial power P510 as an input and pass a high-frequency current through a coil 71. In this arrangement, output power is controlled by changing the switching frequency of the switching element SW401. So-called "soft switching" is carried out by causing the coil 71 and resonant capacitor C201 to resonate and performing switching when the voltage impressed upon the switching element SW401 becomes zero, thereby diminishing switching loss.

FIG. 11 illustrates emitter-collector voltage Vce of the switching element SW401 in power supply device 524, current Ic that flows into the switching element SW401, loss P produced in the switching element SW401, and driving signal CS401 of the switching element SW401.

The switching element SW401 is controlled so as to be turned on and off when at the high and low levels, respectively, and passes a high-frequency current through the coil 71 by being turned on and off. The coil 71 is connected in parallel with the resonant capacitor C201 and an AC voltage is applied thereto by turning the switching element SW401 on and off. The coil 71 and resonant capacitor C201 form a parallel resonant circuit and switching of the switching element SW401 is performed at a frequency lower than the resonance frequency. The closer the switching frequency is to the resonance frequency, the higher the impedance of the parallel resonant circuit and the more difficult it becomes for current to flow. The closer the switching frequency is to the resonance frequency, therefore, the lower the power that is input to the coil 71. At the time of a low power output, therefore, the switching frequency is raised and approaches the resonance frequency. However, if the switching frequency comes too close to the resonance frequency, the resonating state can no longer be maintained. As a consequence, the switching element turns on without a sufficient decline in the voltage impressed upon the switching element, and there is an increase in the proportion of loss.

At the time of low power output, therefore, the switching element is driven at a switching frequency within a range that will not deviate from resonance and the switching operation is changed over from continuous to intermittent operation to thereby realize a low power output efficiently.

In the above-mentioned voltage-resonance power supply device, an IGBT (insulated-gate bipolar transistor) is often used as a switching element for dealing with high power. As far as the element characteristics of an IGBT are concerned, there is a so-called "tail phenomenon" in which current flows for a fixed period of time even after the element is switched off. A current Ic[A] that flows into the switching element SW401 has the waveform shown in FIG. 11. Specifically, at timing t1 in FIG. 11, the switching element SW401 is turned off and the current Ic[A] that flows into the switching element SW401 decreases. In an interval up to t2, however, the current increases again and then decreases again. This is a tail current It. In the interval from t1 to t2, a loss Pt[W] occurs and is ascribable to the tail current It and a voltage Vce that rises from timing t1. Owing to the tail phenomenon, loss is produced by the rise in voltage and tail current after a switch-off even though the voltage is applied to the switching element at the time of switch-off.

The fact that the proportion of noise due to the tail phenomenon is a major part of the loss produced by the overall power supply circuit is a problem. The method described in the specification of U.S. Pat. No. 6,608,289 seeks to improve upon efficiency at the time of low-power output. However, the method is not effective in reducing loss and improving efficiency at the time of ordinary operation, namely at the time of operation other than low-power operation, and there is no reduction in loss ascribable to the tail phenomenon.

SUMMARY OF THE INVENTION

The present invention has been devised in view of the foregoing circumstances and provides a power supply device for suppressing a rise in voltage impressed upon a switching element in an interval of time in which a tail current is flowing, thereby enabling a reduction in loss ascribable to the tail phenomenon. The invention further provides a heating unit that uses this power supply device and an image forming apparatus that uses the heating unit.

The present invention provides a power supply device for passing a high-frequency current into an inductive load, comprising: a generating circuit configured to generate a DC voltage; a first switch element connected in series with the inductive load and configured to switch the DC voltage generated by the generating circuit; a driving controller adapted to turn the first switch element on and off; a variable-capacitance capacitor constructing a resonant circuit together with the inductive load; and a capacitance controller configured to control the capacitance of the variable-capacitance capacitor; wherein the capacitance controller controls the capacitance of the variable-capacitance capacitor in such a manner that over a predetermined interval from the moment the first switch element is turned off, the capacitance will exceed the capacitance that prevailed prior to turn-off of the first switch element.

In accordance with the present invention, when use is made of a switching element that has an interval in which current flows after the element is switched off, the total amount of loss produced in the overall circuit can be reduced. This contributes to a reduction in size, a saving in terms of energy and lower cost.

Further, shutdown can be achieved safely also in a case where an excessive voltage is impressed upon a switching element.

Further features of the present invention will become apparent from the following description of exemplary embodiments with reference to the attached drawings.

DESCRIPTION OF THE EMBODIMENTS

First Embodiment

Figure 2:
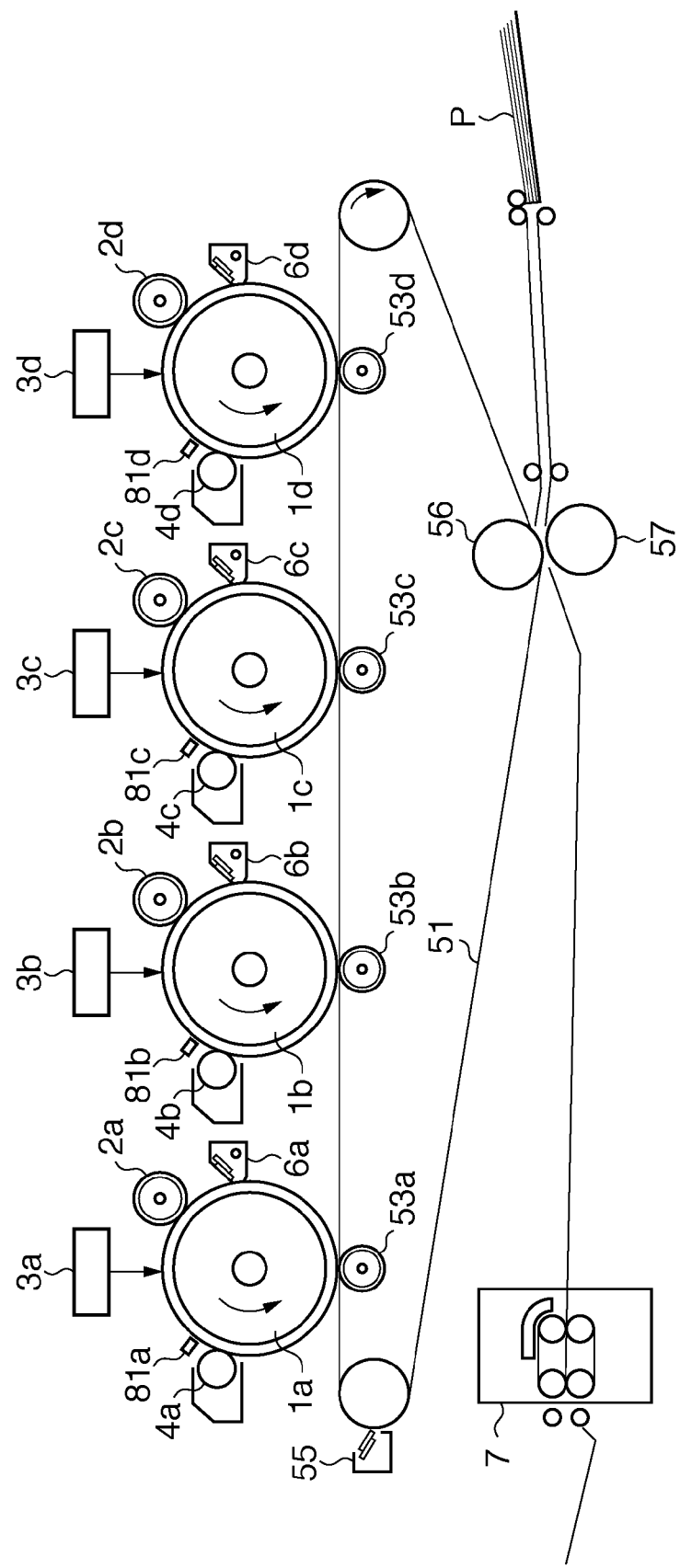
FIG. 2 is a diagram illustrating an example of the configuration of an image forming apparatus according to the first embodiment of the present invention.

An electrophotographic color image forming apparatus having the configuration shown in FIG. 2 will now be described as a first embodiment of the present invention. In FIG. 2, photosensitive drums 1a to 1d are charged uniformly by primary charging units 2a to 2d, respectively, after which exposure conforming to an image signal is performed by exposing units 3a to 3d, respectively, thereby forming electrostatic latent images on the photosensitive drums 1a to 1d. Toner images are then developed by developing units 4a to 4d, the toner images on the four photosensitive drums are transferred in superimposed form to an intermediate transfer belt 51 by primary transfer units 53a to 53d, and the images are then transferred to printing paper P by secondary transfer units 56, 57. Residual toner on the photosensitive drums is recovered by cleaners 6a to 6d, and residual toner on the intermediate transfer belt is recovered by a belt cleaner 55. The toner image that has been transferred to the printing paper P is fixed by a fixing unit 7. The fixing unit 7 employs electromagnetic inductive heating. Surface-potential sensors 8a to 8d sense the potentials on the surfaces of the photosensitive drums.

Figure 3:
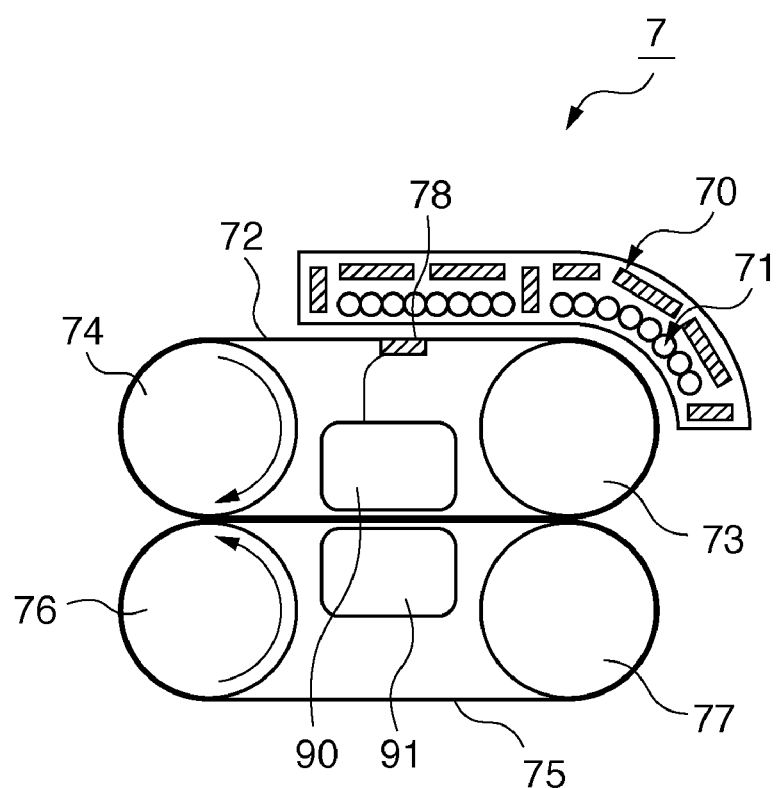
FIG. 3 is a diagram illustrating an example of the configuration of a fixing unit according to the first embodiment of the present invention.

FIG. 3 is a sectional view of the fixing unit 7 shown in FIG. 2. Belts 72, 75 in FIG. 3 are belts that include an electrically conductive heating element. The surface of each of the belts 72, 75 is covered by a rubber layer having a thickness of 300 μm. The belt 72 is stretched between and revolves around rollers 73, 74 in the direction indicated by the arrow, and the belt 75 is stretched between and revolves around rollers 76, 77 in the direction indicated by the arrow. A coil 71, which is an inductive load, is placed within a coil holder 70 opposing the heating element of the belt 72. By passing an alternating current through the coil 71 to generate a magnetic field, the inductive heating element of the belt 72 and the roller 73 undergo self-heating. Three thermisters 78a, 78b, 78c are in abutting contact with the inner side of the belt 72 at central, inner and outer locations, respectively, along the depth direction of FIG. 3 and serve to detect belt temperature. These thermisters are referred to collectively as a thermister 78. The thermister 78 is a resistor the resistance of which rises as the temperature falls. The fixing unit 7 is such that the alternating current that flows through the coil 71 is increased or decreased, or adjusted, in such a manner that the temperature detected by the central thermister 78a will attain a target temperature (190° C., by way of example). Pressure is applied across an upper pad 90 and a lower pad 91. The print medium such a paper is transported from right to left in FIG. 3 by the revolving of the belts 72 and 75 while embraced by the belts and is heated during this period of time so that the toner becomes fixed thereto.

Figure 1:
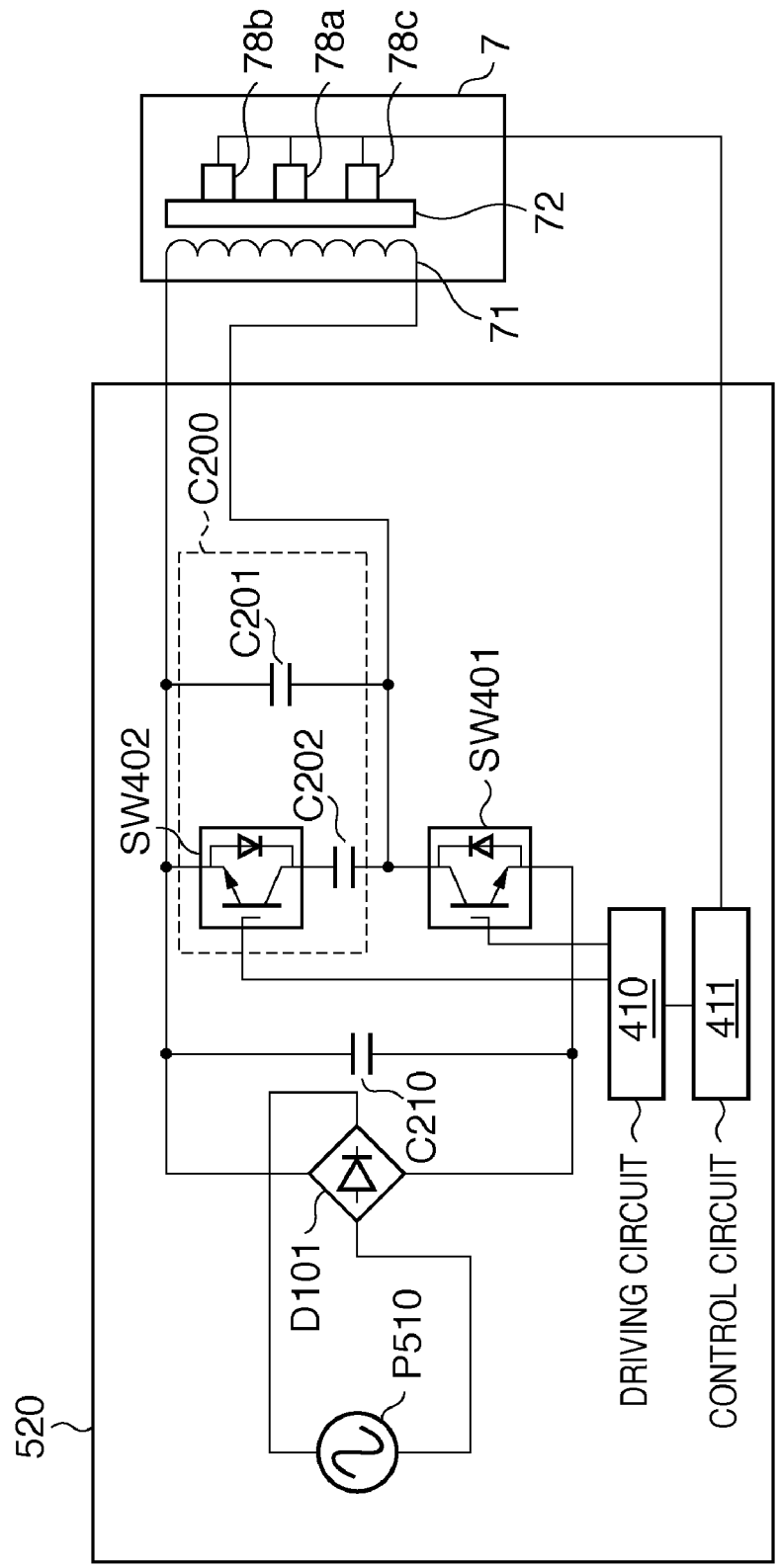
FIG. 1 is a diagram illustrating an example of the configuration of a power supply device according to a first embodiment of the present invention.

A power supply device 520 having the configuration shown in FIG. 1 serves as a power supply device for supplying power to the inductive-heating-type fixing unit 7. As illustrated in FIG. 1, the power supply device 520 receives commercial power P510 as an input and generates a full-wave rectified waveform (DC voltage) using the bridge diode D101 and smoothing capacitor C210. A high-frequency current produced by turning on and off, i.e., closing and opening, the switching element SW401, which is first switching means with respect to the full-wave rectified waveform, flows into the coil 71 connected in parallel with the switching element SW401. First capacitor C201 and second capacitor C202 are resonant capacitors and are connected in parallel with the coil 71 as shown in FIG. 1. The capacitors C201 and C202 can be regarded as a single variable-capacitance resonant capacitor C200 in which electrostatic capacitance can be changed by turning on and off a switching element SW402, which serves as second switching means. It should be noted that the switching of switching element SW401 is performed when there is no potential difference across the two terminals thereof. Further, these two switching-element terminals mentioned in this embodiment refer to two terminals from which a control terminal for application of a control signal for opening and closing the switch is excluded.

The on/off signals of switching elements SW401, SW402 are generated by the control circuit 411 and drive the respective switching elements via the driving circuit 410. IGBTs suitable for high-power applications and having characteristics that differ from each other are selected for the switching elements SW401, SW402. An IGBT is a switching element used when switching at high power is carried out, and the withstand voltage thereof generally is on the order of 600 to 1200 V. Each IGBT incorporates diodes connected in anti-parallel fashion and is capable of passing a reversely directed current when in the off state. The above-mentioned current referred to as a tail current flow into the IGBT for a fixed period of time after the element is turned off. The driving circuit 410 and control circuit 411 are referred to collectively as driving control means since the switching element SW401 is controlled by both of these circuits. The driving circuit 410 and control circuit 411 function also as capacitance control means since they control the switching element SW402. The reason for this is that the capacitance of the resonant capacitor C200 is changed by the switching element SW402.

Example of Driving of Power Supply Circuit

Figure 4:
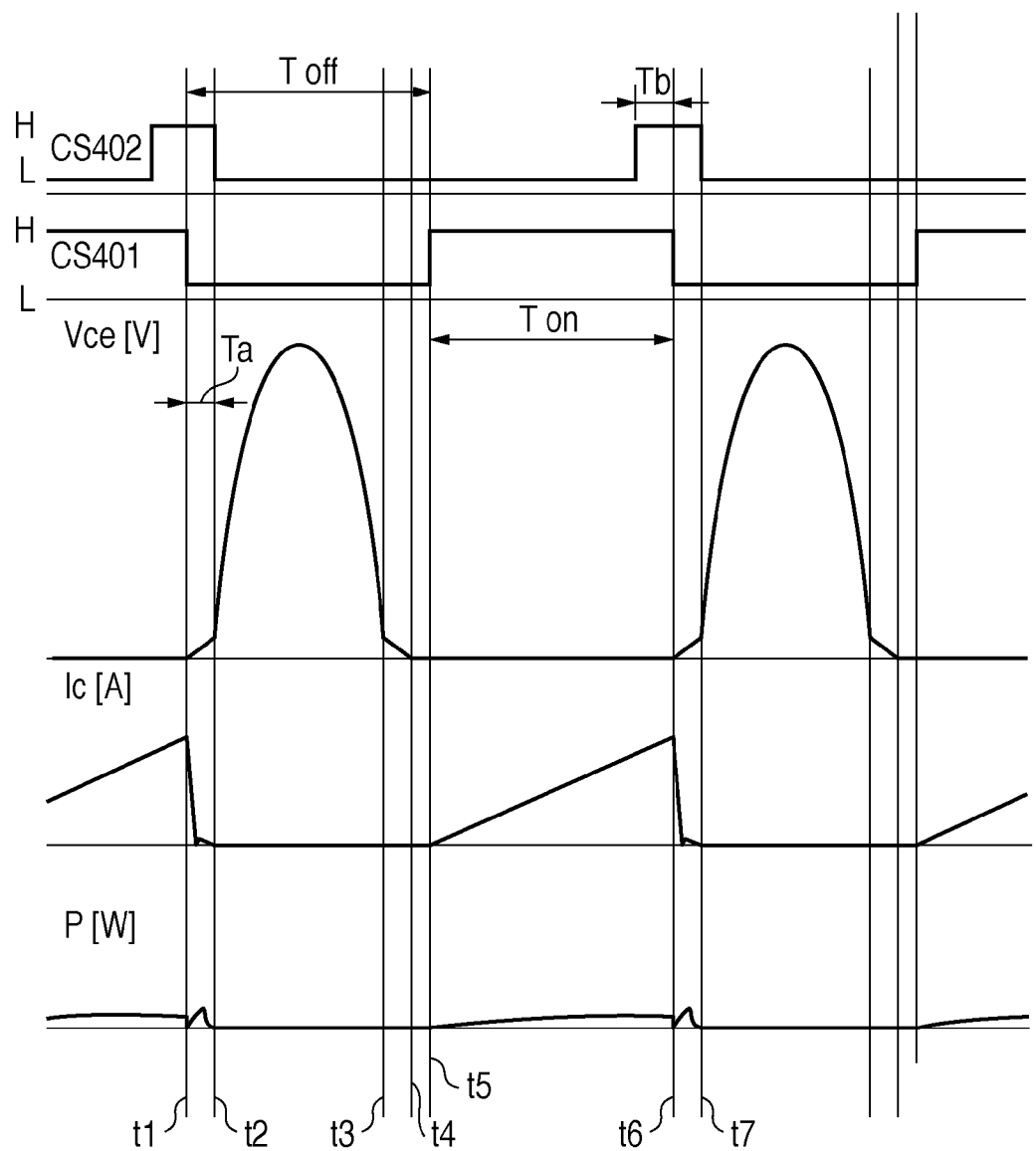
FIG. 4 is a diagram illustrating an example of various waveforms in the power supply device according to the embodiment of the present invention.

The waveforms of the power supply device 520 of FIG. 1 are shown in FIG. 4. Voltage Vce is the collector-emitter voltage of switching element SW401, current Ic is the current that flows into the switching element SW401, and loss P is the loss produced by the switching element SW401. The operation of the switching elements SW401, SW402 and the various waveforms will be described with reference to FIG. 4. Here CS401, CS402, which are the driving signals of the respective switching elements, turn on the switch when at the high level and turn off the switch when at the low level.

First, at timing t1, the switching element SW402 is already on and the resonant capacitors C201, C202 are in a parallel-connected state at this time. The coil 71 and the capacitors C201, C202 construct a resonant circuit. Under these conditions, the electrostatic capacitance of the resonant capacitors has a size obtained by adding the capacitances of the capacitors C201 and C202.

When the switching element SW401 turns off at timing t1, the current that was flowing into the coil 71 up to this point flows into the resonant capacitors C201 and C202 so that these capacitors are charged. Owing to the charging of the resonant capacitors C201, C202, the collector-emitter voltage Vce of the switching element SW401 describes a waveform illustrated in the interval from t1 to t2 in FIG. 4.

Next, when the switching element SW402 turns off at timing t2, the resonant capacitor C202 is disconnected from the resonant capacitor C201 and only the resonant capacitor C201 is charged. At this time the capacitance of the resonant capacitors is that of resonant capacitor C201 alone. As a result, the rate of change (rise) in the voltage Vce exceeds the rate of change in the interval from timing t1 to t2. Here, in view of the characteristic of an IGBT used as a switching element, the interval from t1 to t2 is an interval in which a tail current flows owing to application of voltage to the switching element SW401. As illustrated by the waveforms in FIG. 4, the rise in the voltage Vce is suppressed in the interval from timing t1 to t2 in which the tail current flows. As a result, loss produced by the switching element SW401 is reduced.

In the interval from timing t2 to t3, the voltage Vce changes owing to charging of the resonant capacitor C201 and discharging from the resonant capacitor C201. When the electric charge in capacitor C201 is released and timing t3 arrives, the capacitors C201 and C202 are at the same potential. Consequently, in the interval from timing t3 to timing t4 at which switching element SW401 turns on, the resonant capacitors C201, C202 are at the same potential and the electric charge that has accumulated not only in capacitor C201 but also in capacitor C202 is discharged. As a result, the slope of the change exhibited by the voltage Vce becomes gentler. It should be noted that the discharging of the capacitor C202 in the interval from timing t3 to t4 occurs through the anti-parallel diodes provided in the switching element SW402. As a consequence, the discharging of capacitors C201 and C202 is performed irrespective of the on/off state of the switching element SW402.

In the interval from timing t4 to t5, voltage is not impressed upon the switching element SW401, the switching element SW401 is off, and a current flows into the anti-parallel diodes within the switching element SW401 in a case where the voltage Vce of switching element SW401 has become a negative voltage. The interval from timing t5 to t6 is one in which the switching element SW401 turns on and current flows into the coil 71.

Example of Operation of Power Supply Circuit

Figure 5:
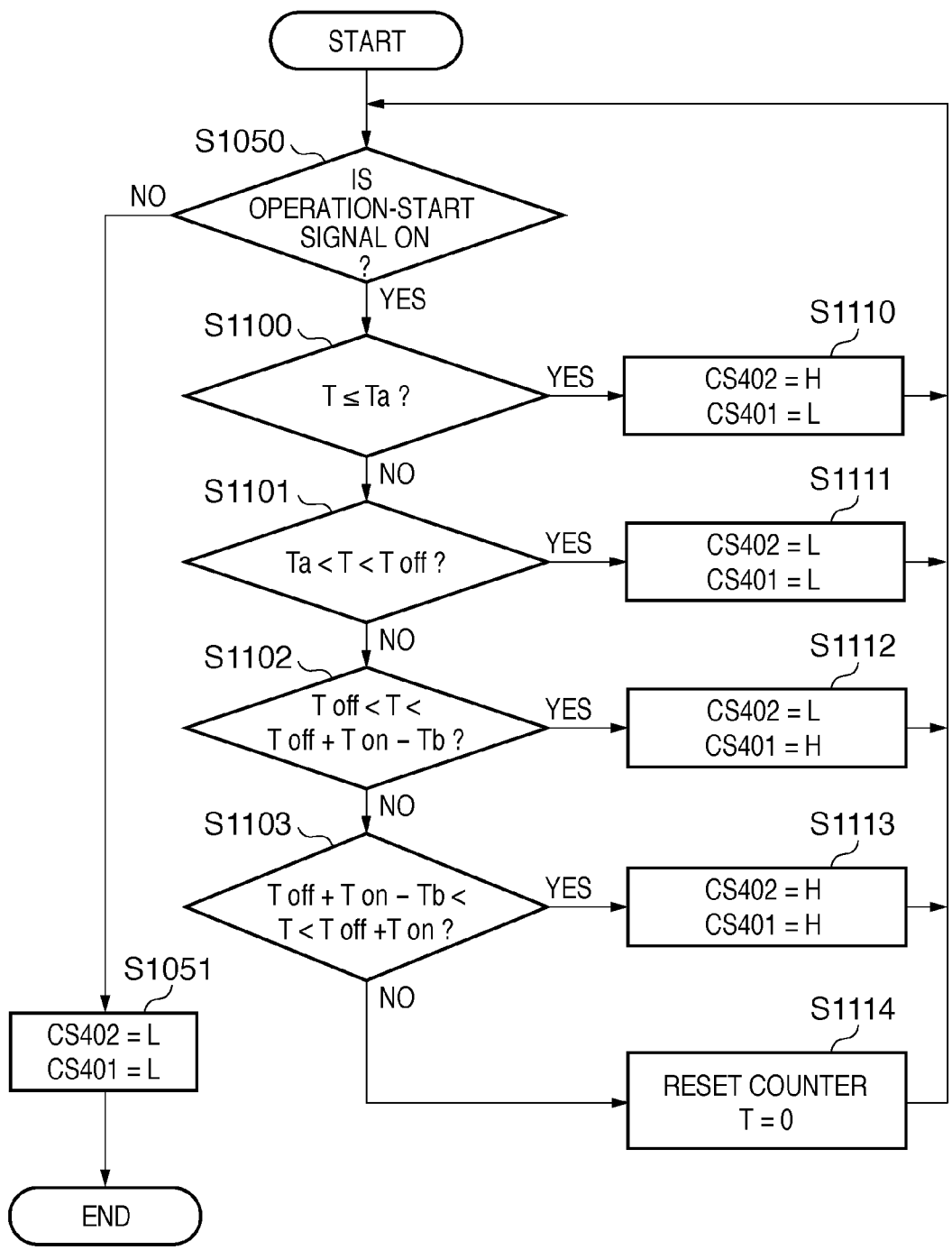
FIG. 5 is a diagram illustrating an example of a flowchart according to the first embodiment of the present invention.

Next, the operation of the control circuit 411 will be described with reference to FIG. 1 and the flowcharts of FIGS. 4 and 5. The control circuit 411 generates the driving signals CS401 and CS402, which are the driving signals for driving the switching elements SW401 and SW402, respectively.

In FIG. 4, Toff represents the period of time during which the switching element SW401 is off, and Ton the time during which the switching element SW401 is on. Further, interval Ta represents an interval in which a rise in the voltage Vce across the terminals of switching element SW401 is suppressed. The interval Ta is set with the time during which a tail current flows into the switching element SW401 as a guideline. The switching element SW402 can be turned on before the switching element SW401 is turned off, with Tb being set as margin time that extends up to the timing at which switching element SW401 turns off.

The switching period of this circuit is the sum of the intervals Toff and Ton, and the switching frequency is defined as the reciprocal of the switching period. As for the interval Toff, it is necessary to set a period of time that extends from the moment at which switching element SW401 turns off and voltage Vce rises to the moment at which voltage Vce subsequently falls again and reaches 0 V. In order to satisfy this condition, it is necessary to change the length of interval Toff in a case where interval Ta has been changed. For example, if the interval Ta is lengthened, then the time it takes for the voltage Vce to reach 0 V again also lengthens, and this makes it necessary to lengthen Toff as well. Conversely, if the interval Ta is shortened, then the time it takes for the voltage Vce to reach 0 V again also shortens. The interval Toff, therefore, can be shortened as well. Since the interval Ta influences the amount of electric charge that is charged in the resonant capacitor C202, it influences not only the interval from t1 to t2 but also the interval from t3 to t4, which is that in which resonant capacitor C202 discharges. Accordingly, on the assumption that the interval Ta is reflected substantially as is in the interval from t1 to t2 and in the interval from t3 to t4, if we let CTa represent a period of time obtained by increasing or decreasing the interval Ta, then 2Ta, which is twice this time period, need only be increased or decreased with respect to Toff. In actuality, if the interval Ta is lengthened, the electric charge that is charged in the resonant capacitor C201 also increases. This means that a more exact new interval Toff can be decided if the amount of increase in this electric charge is taken into consideration.

Next, the operation of the control circuit 411 will be described with reference to the flowchart of FIG. 5. The flowchart of FIG. 5 illustrates the operation of the control circuit 411 in the power supply device 520 used in this embodiment. The operation of other units of the power supply device is performed separately and independently of the flowchart of FIG. 5.

The control circuit 411 incorporates a counter for counting up a counter value T indicative of elapse of time from timing t1. As far as deciding the operation of the control circuit 411 is concerned, in order to determine what the particular timing is within the switching period, the counter is always referred to whenever the processing flow enters a branch point in the flowchart, and the count thus obtained is then substituted into the counter value T. Here the counter value T is strictly for the purpose of determining what the present timing is within a single switching period. Since the counter is adapted so as to be reset every single switching period, the counter value T can be construed as being elapsed time within one switching period.

Although the interior of the image forming apparatus (copier) is not particularly illustrated, it includes such devices as a host controller for controlling motors and fixing units, a high-voltage power source, a low-voltage power source and a laser scanner unit. In a case where these devices start up independently of one another when power is introduced and the unit has a host controller, a standby state is in effect until a command is received from this controller. Alternatively, with regard to the minimum level of operation that does not require a command from a host controller, it may be so arranged that the unit operates independently. An example of the processing flow when the copier is started up will be illustrated. After power is introduced, each unit is started up independently and the controller checks the status within the copier. Then, when warm-up of the copier is started to prepare for printing, the controller sends an operation-start signal to the control circuit 411.

First, when power is introduced and operation starts, the control circuit 411 determines at step S1050 whether the operation-start signal is on. If the operation-start signal is on, the control circuit 411 causes the power supply device 520 to start switching. In this embodiment, after start of control by the control circuit 411, the control circuit 411 discriminates the operation-start signal whenever there is output of the control signals CS401, CS402 to the switch. This arrangement makes possible operation in which the system stands by for the operation-start signal.

If a "NO" determination is made at step S1050, the control circuit 411 turns off both of the switching elements SW401, SW402 at step S1051. On the other hand, if a "YES" determination is made at step S1050, step S1100 is executed. Here the control circuit 411 determines whether the count value T is equal to or less than the time period Ta during which the tail current flows. If the determination is "YES", it can be concluded that the timing represented by the counter value T is within the interval of timings t1 to t2 in FIG. 4. Accordingly, the control circuit 411 proceeds to step S1110 and sets the control signals CS402 and CS401 to H and L, respectively. That is, the control circuit 411 turns on the switch 402 and turns off the switch 401.

If a "NO" determination is made at step S1100, the control circuit 411 executes step S1101 and determines whether the counter value T is greater than Ta and less than Toff. If a "YES" determination is made at step S1101, it can be concluded that the timing represented by the counter value T is within the interval of timings t2 to t5 in FIG. 4. Accordingly, the control circuit 411 proceeds to step S1111 and sets both of the control signals CS402 and CS401 to L. That is, the control circuit 411 turns off the switching element 402 and turns off the switching element 401 as well.

If a "NO" determination is made at step S1101, the control circuit 411 executes step S1102 and determines whether the counter value T is greater than Toff and less than Toff+Ton−Tb. If a "YES" determination is made at step S1102, it can be concluded that the timing represented by the counter value T is within the interval of timings t5 to t6 in FIG. 4. Accordingly, the control circuit 411 proceeds to step S1112 and sets the control signals CS402 and CS401 to L and H, respectively. That is, the control circuit 411 turns off the switching element SW402 and turns on the switching element SW401. It should be noted that although the time period Tb is an interval in which both of the switching elements SW401 and SW402 turn on, the resonance capacitors are not charged in this interval. Accordingly, it will suffice if Tb is decided appropriately within the interval of Ton.

If a "NO" determination is made at step S1102, the control circuit 411 executes step S1103 and determines whether the counter value T is greater than Toff+Ton−Tb and less than Toff+Ton. If a "YES" determination is made at step S1103, it can be concluded that the timing represented by the counter value T is within the interval of timings t6-Tb to t6 in FIG. 4. Accordingly, the control circuit 411 proceeds to step S1113 and sets both of the control signals CS402 and CS401 to H. That is, the control circuit 411 turns on the switching element 402 and turns on the switching element 401 as well.

Operation thus far is that over a single switching period. In a case where a "NO" determination is made at step S1103, however, the timing represented by the counter value T is a period of time later than timing t6 in FIG. 4 and a transition has already been made to the next switching period. Consequently, the control circuit 411 executes step S1114. At step S1114, the control circuit 411 makes the counter value zero and resets the counter. By virtue of this operation, the counter value T can be made zero at the start of the switching period and can indicate the time that has elapsed from the start of the switching period.

It should be noted that the driving circuit 410 drives the switching elements SW401 and SW402 in accordance with the driving signals CS401 and CS402, respectively, that are output from the control circuit 411. Since both of the switching elements are IGBTs in this embodiment, on/off switching of the switching elements is performed by controlling the respective gate signals.

By virtue of the above-described operation, the waveforms of each of the parts of power supply device 520 take on the waveforms shown in FIG. 4. In this way it is possible to suppress the voltage Vce across the terminals of the switching element SW401 in the interval in which a tail current is produced in the switching element SW401. As a result, loss produced by the switching element SW401 can be suppressed.

It is preferred that an IGBT having a small tail current be employed as the switching element SW402. In general, the withstand voltage and the size of the tail current of an IGBT have a trade-off relationship between them; if priority is given to one, often the characteristic of the other deteriorates. With an IGBT of elevated withstand voltage, the tail current tends to increase and a large loss is produced when the element is switched off. However, with a grade of IGBT in which tail current is reduced and withstand voltage lowered, tail loss can be reduced. A low withstand voltage, however, is a limitation in terms of circuit design. Further, with regard also to the anti-parallel diodes incorporated within the IGBT, forward-voltage drop is small with a grade of IGBT of lowered withstand voltage. With a grade of IGBT of elevated withstand voltage, forward-voltage drop tends to increase and switching loss tends to be greater.

In this embodiment, an IGBT having excellent withstand voltage is used as the switching element SW401, and an IGBT of reduced withstand voltage and small tail current is used as the switching element SW402. Although the switching element SW401 has its tail loss diminished by the operation of the switching element SW402, there is no mechanism for mitigating loss in the switching element SW402. However, since the resonant capacitor C202 and switching element SW402 each divide voltage, the voltage impressed across the switching element SW402 is reduced by the amount of voltage impressed across the resonant capacitor C202. This means that a grade of IGBT of lower withstand voltage and smaller loss in comparison with the IGBT of switching element SW401 can be used as the switching element SW402 and, hence, the tail current thereof can be reduced. This means that loss in the switching element SW402 becomes sufficiently small. By selecting components in this manner, occurrence of loss in the switching element SW401 is reduced, as illustrated by loss P in FIG. 4, and, at the same time, loss produced by the switching element SW402 also is reduced in comparison with the case where the circuit is constructed by the switching element SW401 alone. As a result, it is possible to reduce the total amount of loss produced by the overall circuit.

Figure 11:
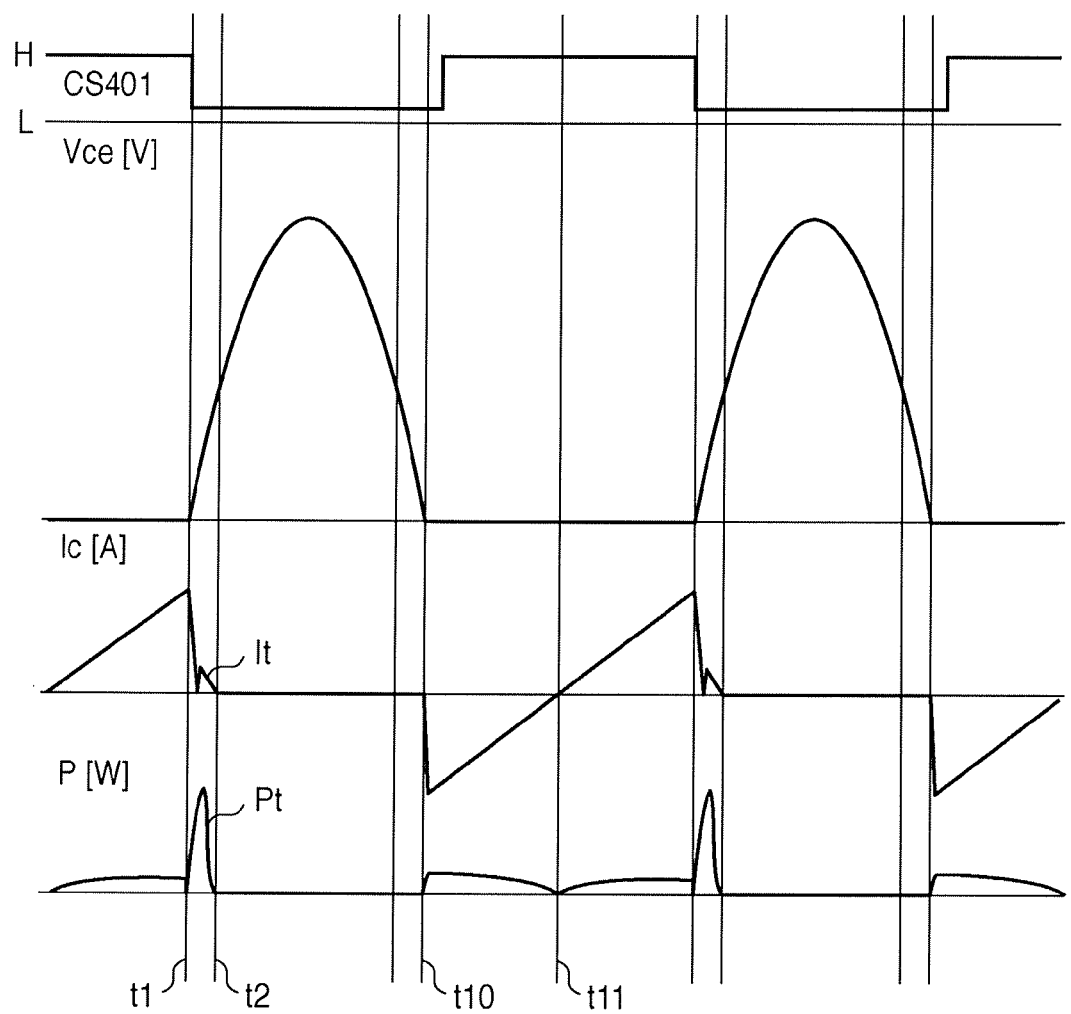
FIG. 11 is a diagram illustrating an example of various waveforms in the power supply device of the prior art.

It will be understood from curve Ic in FIG. 11, which represents the waveforms in a case where the conventional power supply device is used, that there is an interval from timing t10 to t11 in which current flows in the negative direction. This interval is one in which current flows into the anti-parallel diodes of the switching element SW401. In view of the curve Ic in FIG. 4 illustrating an example of the waveforms according to this embodiment, it will be understood that there is no interval in which a current flows in the reverse direction and that current does not flow into the anti-parallel diodes of the switching element SW401. Instead of current flowing into the diodes of the switching element SW401, current flows into the anti-parallel diodes of the switching element SW401. However, since the forward voltage drop is small, loss produced by these diodes is small. Thus, an IGBT of superior withstand voltage in comparison with the switching element SW402 preferably is selected as the switching element SW401, and an IGBT having a small tail current in comparison with the switching element SW401 preferably is selected as the switching element SW402. In the case of a power supply device that is capable of outputting 1100 W, for example, efficiency can be improved by about 2% thanks to the reduction in loss described above. This is one example of the effect of loss mitigation.

Reducing the total amount of loss produced in the overall circuit, in the manner described above, contributes to energy savings, suppresses a rise in circuit temperature and makes it possible to reduce the size and lower the cost of the overall circuitry.

Second Embodiment

The arrangement of a power supply device 521 for supplying power to a fixing unit of an image forming apparatus according to a second embodiment of the present invention is obtained by adding a voltage detector V501 to the power supply device 520 described in the first embodiment. The image forming apparatus of the second embodiment will be described in detail with reference to FIG. 6. Components similar to those in the first embodiment are not described again.

Figure 6:
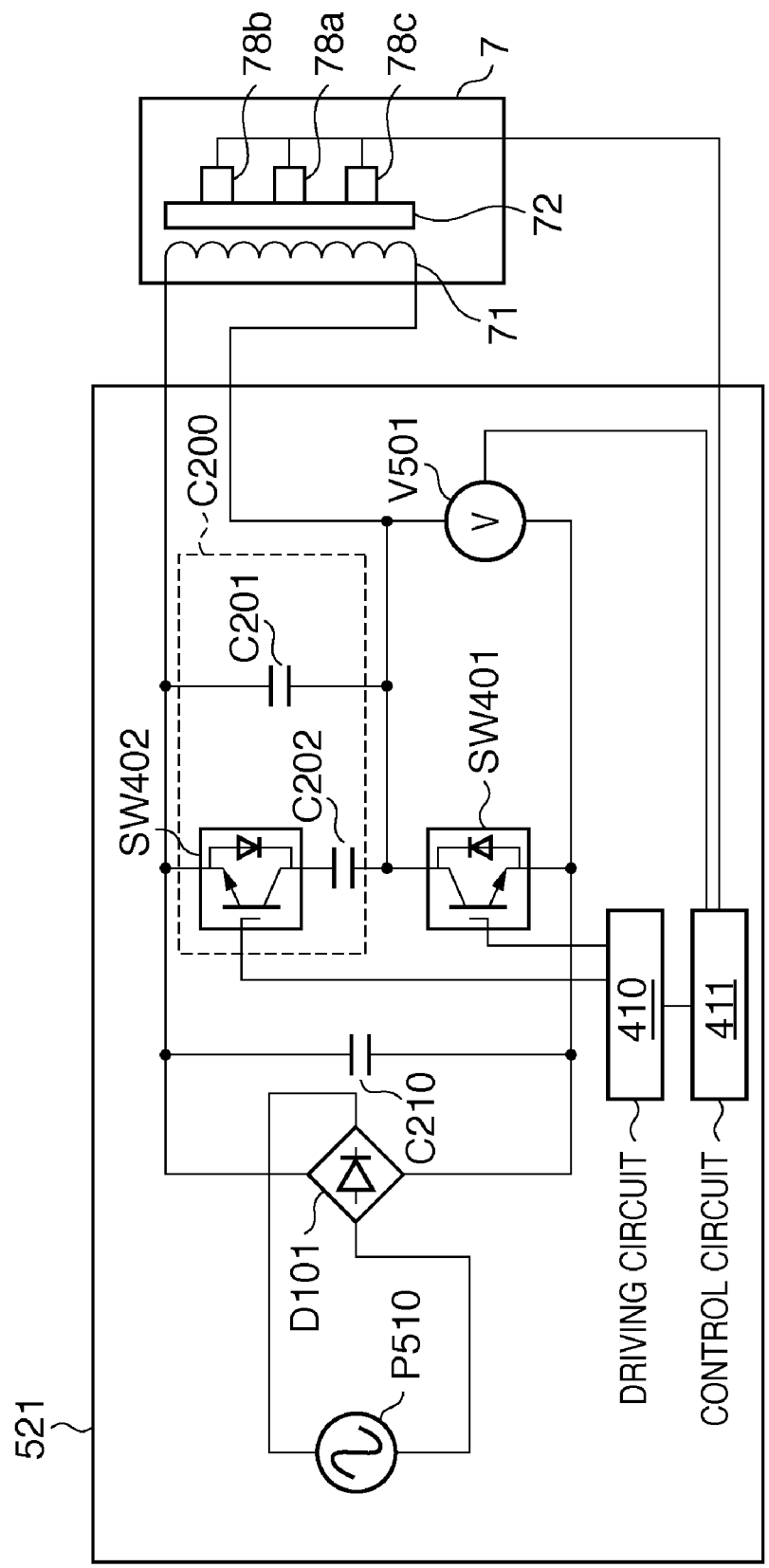
FIG. 6 is a diagram illustrating an example of the configuration of a power supply device according to a second embodiment of the present invention.

The voltage detector V501 shown in FIG. 6 functions as voltage detecting means for detecting the voltage Vce impressed upon the switching element SW401. There is a possibility that when the voltage Vce exceeds an assumed voltage value (1000 V, for example), the withstand voltage of the switching element SW401 will be exceeded by a further rise in the voltage Vce and the element will be destroyed. If such an abnormal rise in the voltage Vce is detected, the switching element SW402 is turned on by the control circuit 411, as a result of which the current that had been charging the resonant capacitor C201 up to this point flows into the resonant capacitor C202 as well, thereby making it possible to suppress the rise in voltage Vce.

Figure 7:
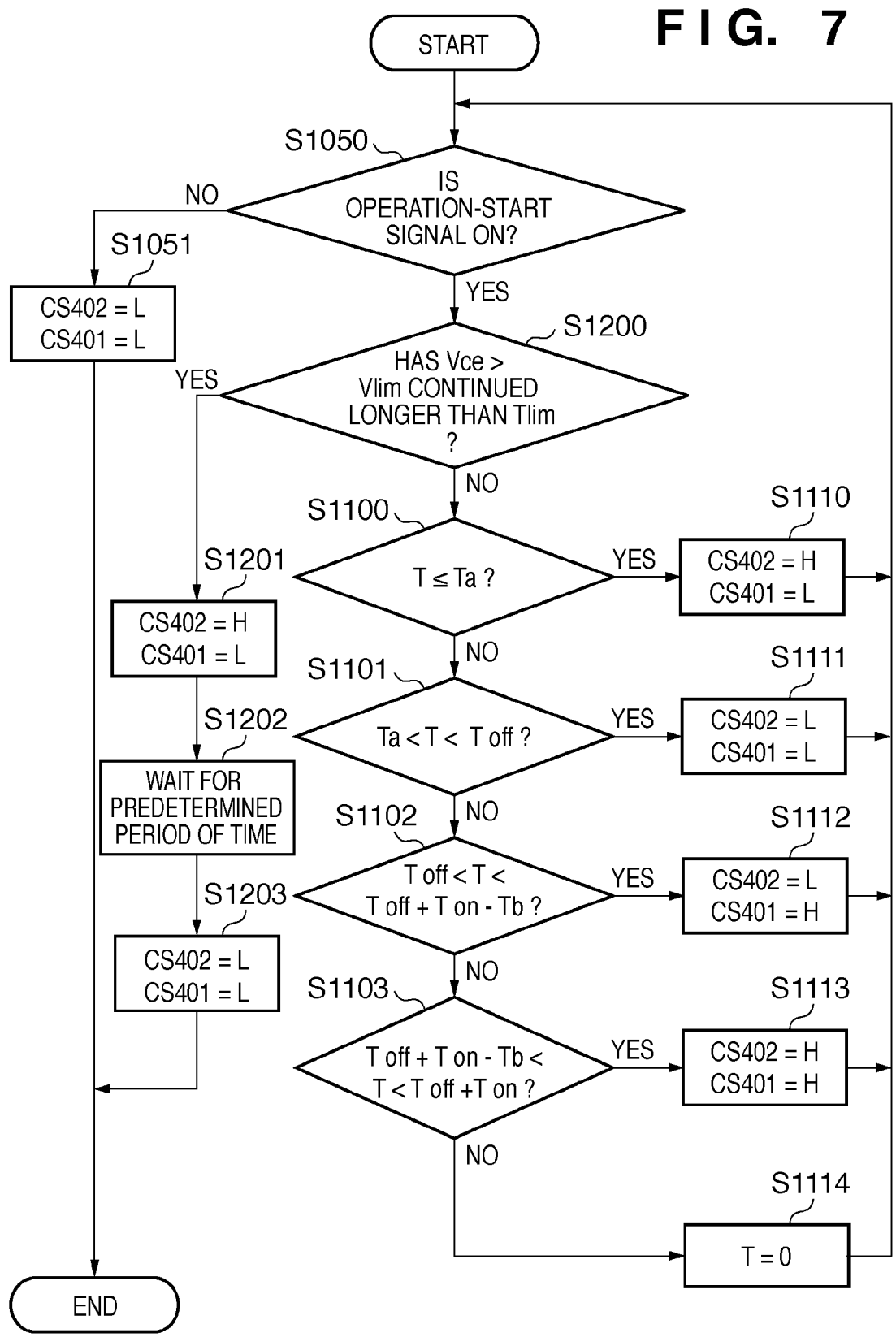
FIG. 7 is a diagram illustrating an example of a flowchart according to the second embodiment of the present invention.

The operation of the control circuit 411 will be described with reference to the flowchart of FIG. 7. Processing steps in the flowchart of FIG. 7 similar to those in the flowchart of FIG. 5 of the first embodiment will not be described again. At step S1200 in the flowchart of FIG. 7, the control circuit 411 determines whether the length of time over which the voltage Vce exceeds a predetermined reference voltage Vlim is greater than a reference time Tlim. If the determination made at step S1200 is "NO", then control proceeds to step S1100 and the circuit operates in the usual manner. If the determination made at step S1200 is "YES", then control proceeds to step S1201. "Operation in the usual manner" refers to the operation described in conjunction with FIG. 5 of the first embodiment. A suitable reference value (520 V, for example) that does not exceed the withstand voltage of the switching elements has been set as the reference voltage Vlim. It is preferred that this value be decided in accordance with the specifications of the switching element SW401. The reference time Tlim is a reference value for determining that the voltage Vce across the terminals of the switching element SW401 has exceeded the reference voltage Vlim for more than a fixed period of time (0.5 µs, for example), and it is set in order to avoid erroneous detection due to noise or the like.

Step S1201 is an operation for protecting the switching element SW401. The control circuit 411 forcibly turns on the switching element SW402, thereby suppressing a rise in the voltage of the switching element SW401. Thereafter, at step S1202, the state of step S1201 is allowed to continue long enough for the voltage Vce to fall sufficiently. The waiting time at step S1202 is a predetermined predetermined period of time. In the interval in which the switching element SW401 is off and the switching element SW402 is on, the rate of change in voltage Vce is gentle, as indicated in the intervals of timings t1 to t2 and t3 to t4 in FIG. 4. Therefore, although the time it takes for the voltage Vce to fall is longer than that at the time of normal operation, the rise in voltage after the voltage Vce has exceeded the reference voltage Vlim becomes more gentle and the voltage Vce can be allowed to drop without the withstand voltage of the switching element SW401 being exceeded.

Owing to standby for the fixed period of time, the voltage Vce declines sufficiently (below the withstand voltage) and therefore the control circuit 411 places the control signal CS402 at the L level at step S1203. Control of switching is then terminated. The reason for this is that since application of a voltage that exceeds the withstand voltage limit of the switching element SW401 represents a state that is not normal, it is preferred that operation be halted. Even if such an arrangement is adopted, there is no inconvenience in terms of operation and a state in which both switching element SW401 and switching element SW402 are off is attained also when operation ends after this. Owing to such operation, abnormal rise in the voltage Vce is suppressed and it is possible to protect the switching element SW401.

Third Embodiment

The arrangement of a power supply device 522 for supplying power to a fixing unit of an image forming apparatus according to a third embodiment of the present invention is obtained by substituting a current detector A502 for the voltage detector V501 described in the second embodiment. The image forming apparatus of the third embodiment will be described in detail with reference to FIG. 8. Components similar to those in the first and embodiments are not described again.

Figure 8:
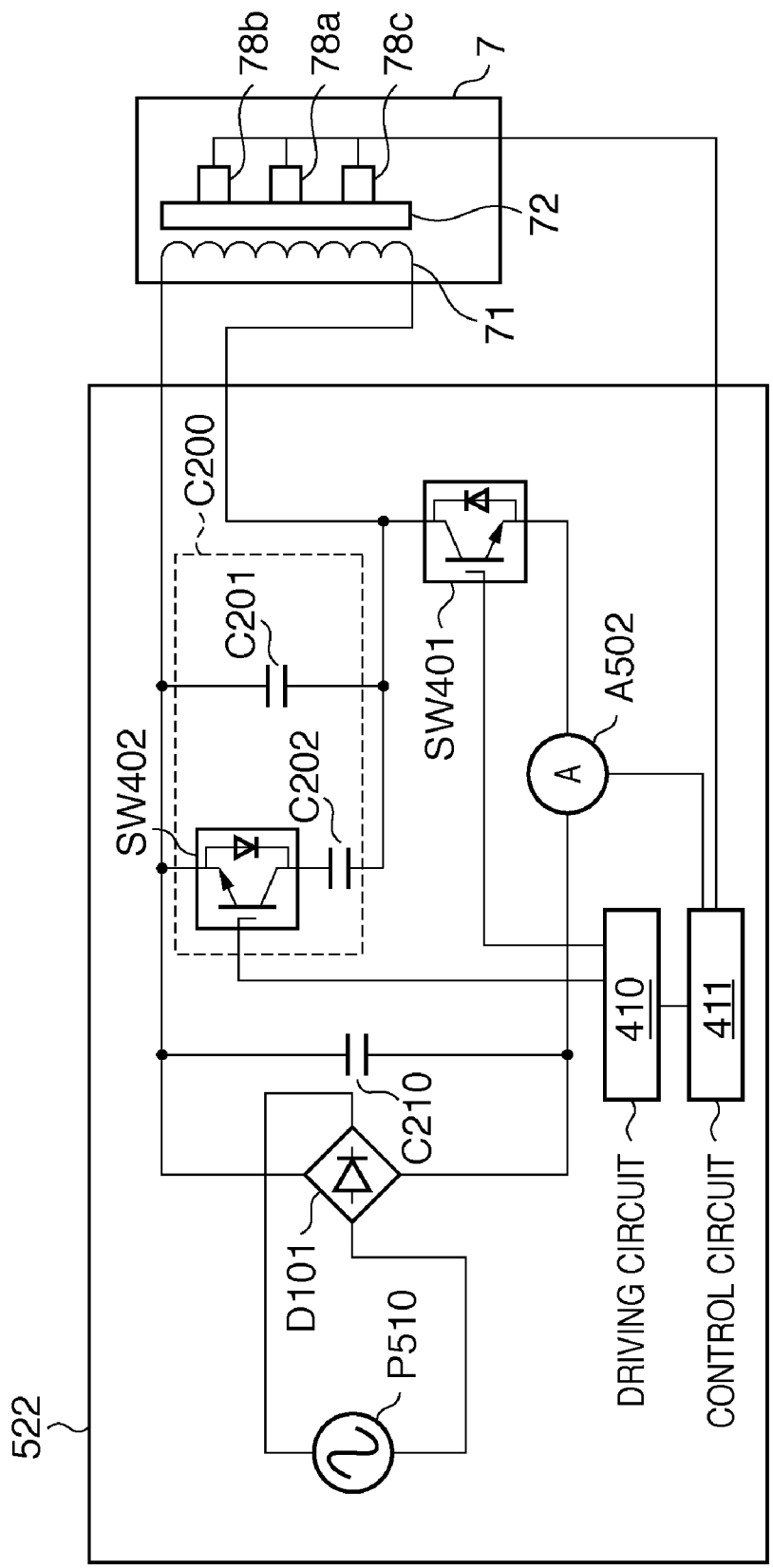
FIG. 8 is a diagram illustrating an example of the configuration of a power supply device according to a third embodiment of the present invention.
Figure 9:
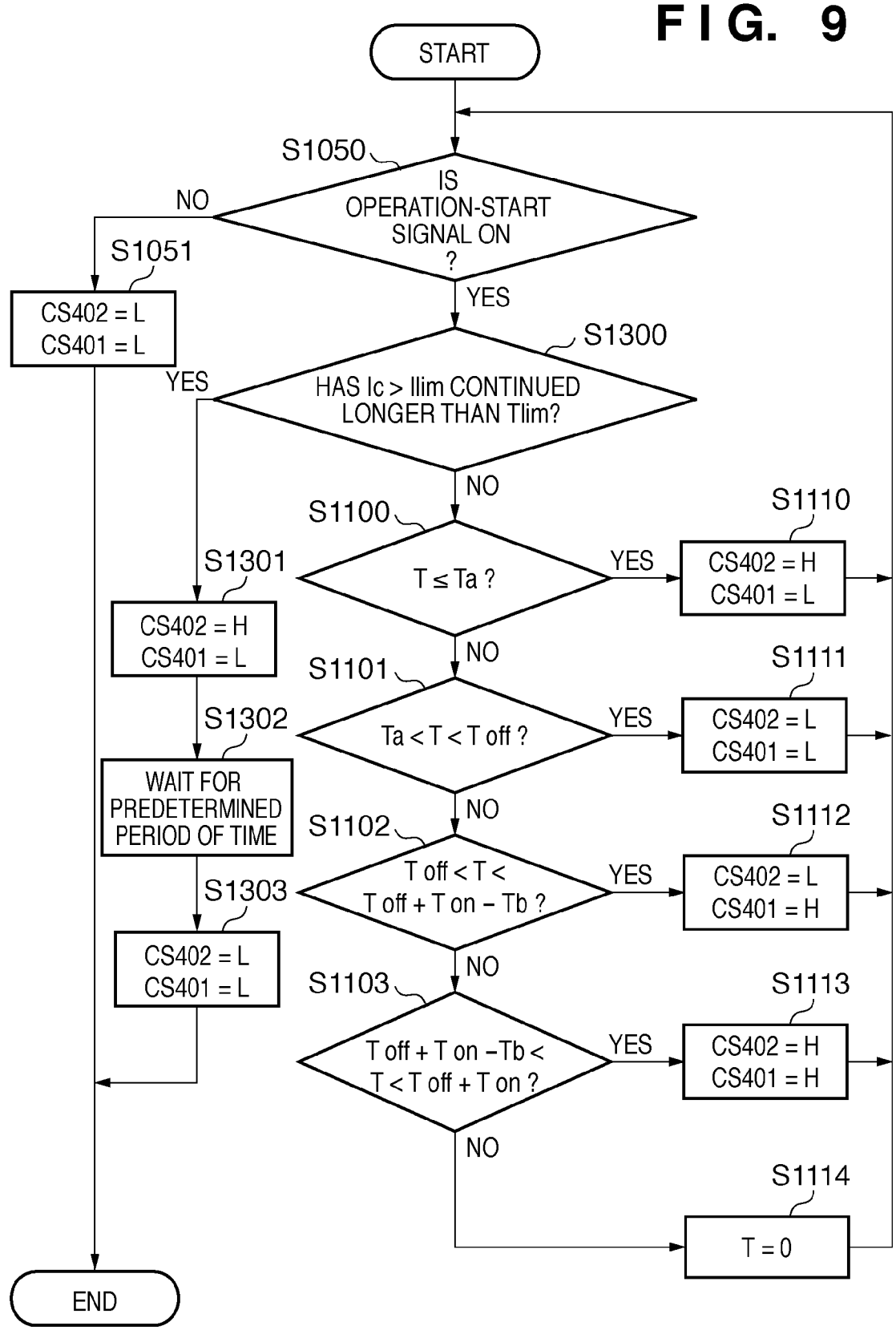
FIG. 9 is a diagram illustrating an example of a flowchart according to the third embodiment of the present invention.
Figure 10:
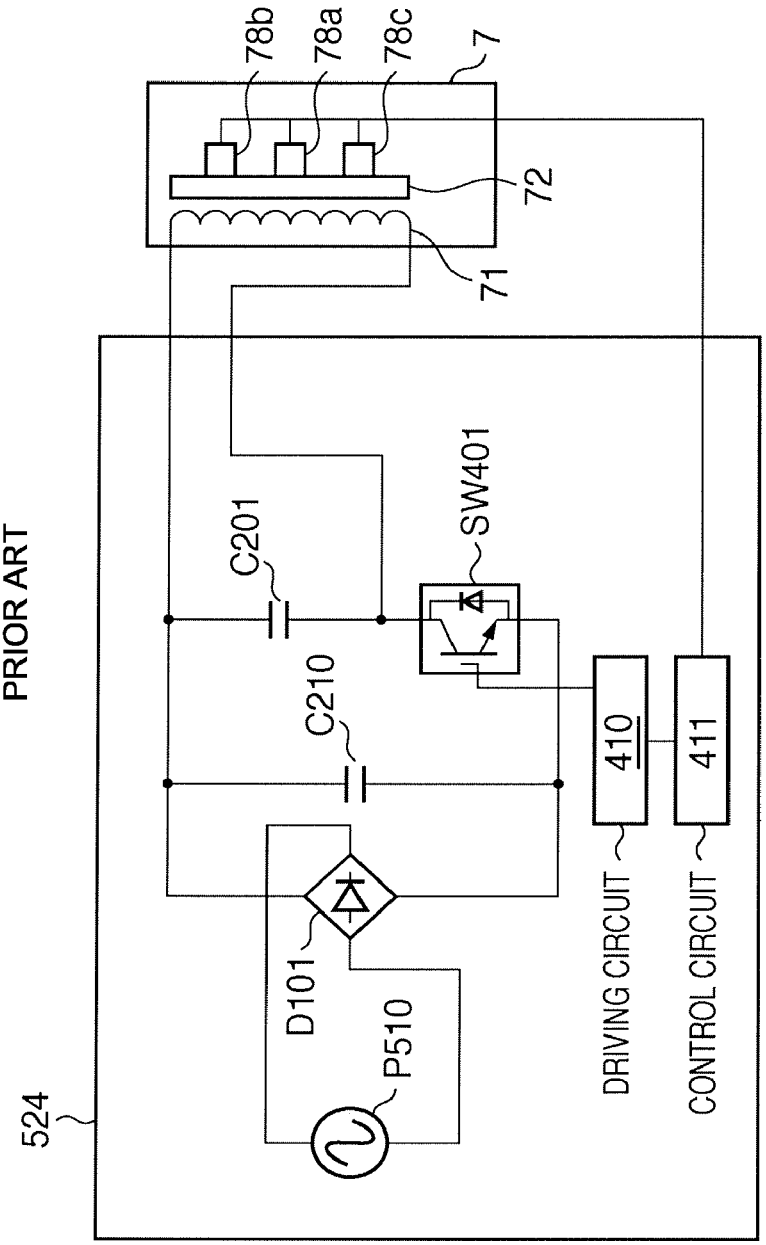
FIG. 10 is a diagram illustrating an example of the configuration of a power supply device according to the prior art.

The current detector A502 shown in FIG. 8 functions as current detecting means for detecting the current that flows into the switching element SW401. In the interval from timing t5 to t6, the switching element SW401 is on and the current that flows through the coil 71 is flowing into the switching element SW401 as is. It can be predicted that the larger the current that flows through the coil 71 at this time, the larger the current that charges the resonant capacitor C201 after the switching element SW401 is turned off and the higher the voltage Vce. Accordingly, the fact that a current greater than a fixed current has flowed for more than a fixed period of time is detected by the current detector A502 and the control circuit 411 forcibly turns on the switching element SW402, in which state the switching element SW401 is turned off. In this way a rise in the voltage Vce is suppressed and it is possible to protect the switching element SW401 and halt operation safely. Such operation will be described in detail with reference to the flowchart of processing executed by the control circuit 411 shown in FIG. 9.

In this embodiment, the control circuit 411 reads the current value Ic that has been detected by the current detector A502 and determines whether this current value Ic has exceeded a reference value Ilim, which is a predetermined current-limit value, over a length of time greater than a predetermined reference time Tlim (step S1300). If the reference value Ilim has been exceeded over a length of time greater than the predetermined reference time Tlim, then control proceeds from step S1300 to step S1301. Operation in a case where control proceeds from step S1300 to step S1100 is similar to that of the first embodiment.

At step S1301, the control circuit 411 turns on the switching element SW402 and turns off the switching element SW401 simultaneously.

At step S1302, the control circuit 411 allows the state of step S1301 to continue until the voltage Vce becomes sufficiently low. When switching element SW401 turns on, the current that had been flowing through the coil 71 charges the resonant capacitors C201 and C202. The standby time at step S1302 may be the same as that at step S1202 in FIG. 7 of the second embodiment. Owing to the fact that the switching element SW402 is on, the maximum value of voltage Vce is small in comparison with a case where only the resonant capacitor C201 is charged. Owing to such operation, it is possible to suppress an abnormal rise in the voltage Vce that can occur in a case where the switching element SW402 is not forcibly turned on, and thus it is possible to protect the switching element SW401.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-262368, filed Nov. 17, 2009, which is hereby incorporated by reference herein in its entirety.

What is claimed is:

1. A power supply device for passing a high-frequency current into an inductive load, comprising:
    a generating circuit configured to generate a DC voltage;
    a first switch element connected in series with the inductive load and configured to switch the DC voltage generated by said generating circuit;
    a driving controller adapted to turn said first switch element on and off;
    a variable-capacitance capacitor constructing a resonant circuit together with the inductive load; and
    a capacitance controller configured to control the capacitance of said variable-capacitance capacitor;
    wherein said capacitance controller controls the capacitance of said variable-capacitance capacitor so that the capacitance of the variable capacitance capacitor in a first period is larger than the capacitance of the variable capacitance capacitor after the first period, wherein the first period is a period from a timing when the first switch element is turned off until a predetermined time elapses.

2. The device according to claim 1, wherein said first switch element has a characteristic such that a tail current is applied in response to the first switch element being turned off; and
    the first period is longer than a period during which the tail current is applied.

3. The device according to claim 1, wherein said variable-capacitance capacitor includes a first capacitor, a second capacitor connected in parallel with said first capacitor, and a second switch element connected in series with said second capacitor; and
    said capacitor controller leaves the second switch element turned-on from a timing when the first switch element is turned off until the period elapses, and turns off the second switch element in response to the period elapsing.

4. The device according to claim 1, further comprising a voltage detector for detecting a voltage that is applied to the first switch element;
    wherein said variable-capacitance capacitor includes a first capacitor, a second capacitor connected in parallel with said first capacitor, and a second switch element connected in series with said second capacitor;
    wherein in a case where a voltage detected by the detector exceeds a predetermined voltage over a continuous period, said capacitance controller turns on said second switch element and turns off the first switch element.

5. The device according to claim 1, further comprising a current detector for detecting current flowing into said first switch element;
    wherein said variable-capacitance capacitor includes a first capacitor, a second capacitor connected in parallel with said first capacitor, and a second switch element connected in series with said second capacitor;
    wherein in a case where a voltage detected by the detector exceeds a predetermined voltage over a continuous period, said capacitance controller turns on said second switch element and turns off the first switch element.

6. The device according to claim 2, wherein said first switch element is an insulated-gate bipolar transistor.

7. A heating unit comprising:
    the power supply device as set forth in claim 1;
    an inductive load into which a high-frequency current flows owing to said power supply device; and an electrically conductive heating element placed opposite said inductive load.

8. An electrophotographic image forming apparatus that uses the heating unit set forth in claim 7 as a fixing unit.

9. The device according to claim 1, wherein the capacitance controller turns on the second switching element at a second predetermined period before turning off the first switch element.

10. A power supply device for passing a high-frequency current into an inductive load, comprising:
    a rectifying circuit configured to rectify an alternating current;

a first switch element connected in series with the inductive load and configured to switch the current that has been rectified by said rectifying circuit;

a driving controller adapted to turn said first switch element on and off;

a variable-capacitance capacitor constructing a resonant circuit together with the inductive load, said variable-capacitance capacitor including a first capacitor, a second capacitor connected in parallel with said first capacitor, and a second switch element connected in series with said second capacitor, the capacitance of the variable-capacitance capacitor while the second switch element is on is larger than the capacitance of the variable-capacitance capacitor while the second switch element is off; and a capacitance controller configured to control the capacitance of said variable-capacitance capacitor by switching the second switch between on and off;

a detector adapted to detect a voltage that is applied to the first switch element;

a controller configured to turn off the first switch element and turn on the second switch element in a case where a voltage detected by the detector exceeds a predetermined voltage over a first continuous period, and turn off the second switch element upon a second period elapsing.

11. A power supply device for passing a high-frequency current into an inductive load, comprising:

a rectifying circuit configured to rectify an alternating current;

a first switch element connected in series with the inductive load and configured to switch the current that has been rectified by said rectifying circuit;

a driving controller adapted to turn said first switch element on and off;

a variable-capacitance capacitor constructing a resonant circuit together with the inductive load, said variable-capacitance capacitor including a first capacitor, a second capacitor connected in parallel with said first capacitor, and a second switch element connected in series with said second capacitor, wherein the capacitance of the variable-capacitance capacitor while the second switch element is on is larger than the capacitance of the variable-capacitance capacitor while the second switch element is off; and a capacitance controller configured to control the capacitance of said variable-capacitance capacitor by switching the second switch between on and off;

a detector adapted to detect a current that is applied to the first switch element;

a controller configured to turn off the first switch element and turn on the second switch element in a case where a current detected by the detector exceeds a predetermined current value over a first continuous period, and turn off the second switch element upon a second period elapsing.

* * * * *